Patented Mar. 31, 1936

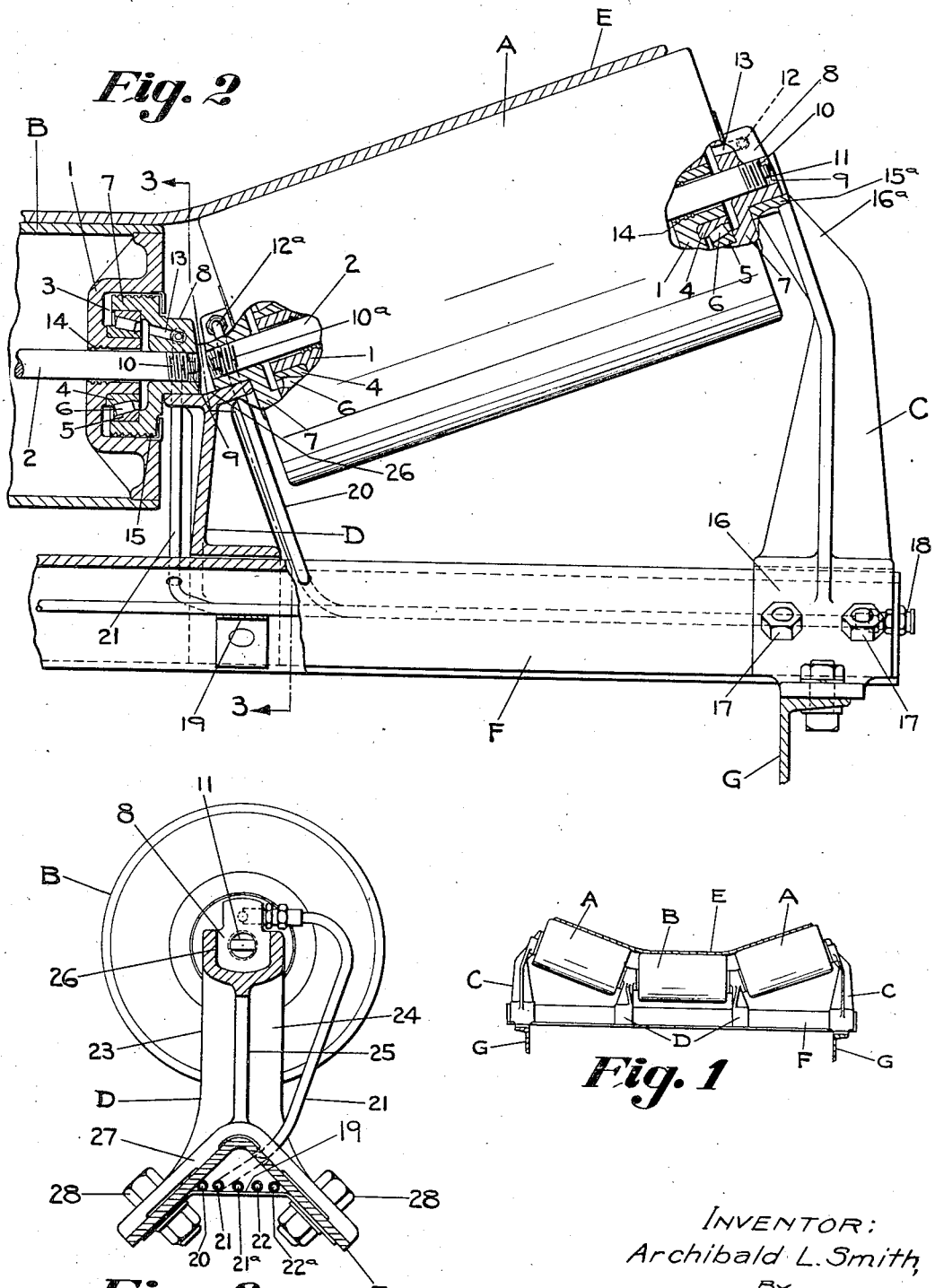

2,035,926

UNITED STATES PATENT OFFICE 2,035,926

MATERIAL HANDLING MECHANISM

Archibald L. Smith, Columbus, Ohio, assignor to The Jeffrey Manufacturing Company, a corporation of Ohio Application April 8, 1933, Serial No. 665,130

7 Claims. (Cl. 308—20)

In material handling mechanism of the type employing an endless belt conveyor, the belt passes over carriers comprising rollers supported on suitable standards in end to end relation, forming roller units extending transversely of the belt. Each of these units comprises at least one intermediate roller, together with end rollers, and, where it is desired to impart a troughlike shape to the belt, the end rollers are inclined upwardly in opposite directions.

In continued service, it becomes necessary, from time to time, to remove certain of the rollers of the respective units for repair, replacement of worn parts, adjustment of the parts, or for other purposes. Accordingly, a considerable amount of manipulation is required for accomplishing this purpose.

As usually constructed, these rollers comprise a shaft extending through the roller coincident with the longitudinal axis thereof, the shaft extending a short distance beyond the ends of the roller. Intermediate the ends of the roller and shaft there are positioned anti-friction bearings, each of which engages the shaft adjacent each end thereof, and which in turn, is enclosed by a suitable housing secured in position on the shaft. These housings rest in suitable brackets which carry the rollers. During operation of the roller, frictional wear occurs around the movable and stationary parts of the bearing, so that from time to time, the bearing must be tightened or replaced, this operation requiring the demounting of the roller and the removal of the housing cover in order to gain access to the interior of the housing.

The present invention deals with an improved construction wherein required adjustments of the bearing may be much simplified, eliminating removal of parts and avoiding demounting of the roller from its supporting brackets.

For this purpose, the axial shaft of the roller is availed of as the means for making the required adjustments, the present invention embracing a novel mounting for this shaft enabling the latter to be utilized for the indicated purpose.

In the usual construction of these idler rollers, the ends of the rollers are closed by concave closure members, which, accordingly, result in the rollers being concave at each end, and thereby prone to collect dirt and other foreign materials during operation of the rollers.

The present invention provides a construction of roller which presents a flush end surface which does not collect dust or dirt, the construction of the roller being characterized by the high degree of simplicity of the mountings and the ease of adjustment of the bearings.

The details of the invention are illustrated by way of example in the accompanying drawing, in which:

Fig. 1 represents an assembled belt troughing idler unit embracing the improvements of the present invention;

Fig. 2 is a fragmentary view of the unit of Fig. 1, showing, in section, the details of the improved construction; and Fig. 3 is a sectional view taken on the line 3—3 of Fig. 2.

Referring more particularly to the drawing, it will be observed that the unit to which the present improved construction is applied is illustrated as including the inclined terminal troughing rollers A, and at least one intermediate roller B. The terminal rollers are inclined as shown to give a trough shape to the conveyor belt E.

The terminal rollers are shown as being supported between terminal standards C and intermediate standards D, each of which standards is secured to the angle base support F, mounted on stringers G.

It will be noted that the terminal and intermediate rollers are of like construction. Each roller embraces a hollow cylindrical shell, the ends of which are closed by the end closure members, or gudgeons, 1, having a central opening for passage of the central shaft or axle 2, extending axially through the roller and projecting beyond the ends thereof. These gudgeons are immovably secured in any suitable manner to the shell of the roller, and each is shaped to define the recess 3. In this recess is positioned a ball or roller bearing race comprising the inner rotative part 4 and outer stationary part 5, between which parts are positioned the ball or roller bearings 6. The end gudgeons 1 are freely rotative around the axle 2, which is, of course, stationary.

The recess 3 is closed by the bearing cap 7, which retains the aforesaid bearing structure in position, and which is provided with a hub portion 8 extending beyond the plane of the roller end. Each of these hub portions rests in a supporting standard and is provided with an axially disposed opening 9 extending therethrough, which opening is internally threaded to receive the threaded end 10 of the axle 2. These threads on each end of the axle run in opposite directions, in other words threads 10 may be right-handed threads, and threads 10a, left-handed threads, respectively. Each end of the axle is provided with a tongue 11, the hole 9 in the bearing cap being sufficiently large to enable a tool to be inserted for gripping the tongue 11, whereby the axle 2 may be turned. Because of the oppositely directed threads on the axle 2, turning of the axle in one direction will simultaneously draw the bearing caps of each roller together to tighten the bearing parts as these become worn in service; or to effect a loosening or removal of the caps 7, should such be desired, the axle 2 is turned in the opposite direction. In other words, adjustment of the bearing parts is effected by simply manipulating the axle 2, from one end thereof, without requiring dismounting of the roller, it being apparent that the roller is supported solely on the hub portions 8 of the bearing caps 7, and not by the axle 2.

Communicating with the interior of one of the terminal bearing caps 7 is the lubricant intake 12 provided with a pressure lubricating fitting opening into the corresponding lubricant channel 13, through which the rotating parts of the bearing structure are lubricated. Leakage of lubricant from around the bearing parts is prevented by a lubricant seal 14 between each gudgeon and the shaft 2, and also by the annular seals 15 inserted between the gudgeons 1 and the bearing caps.

It will be seen that the bearing caps have the hub portion thereof mounted on the supporting standards. Except for details in shape, these standards are of similar construction.

The end standards C embrace a supporting standard having an inclined portion 16a terminating in a U-shaped mounting 15a, in which mounting is received the hub portion 8 of the bearing cap 7 of the terminal roller.

The standard C is also provided with the integral foot piece 16, the sides of which diverge for engagement with the sides of the angle base support F, the foot piece and base support being provided with registering openings for receiving suitable fastening instrumentalities, illustrated by the bolts 17.

Suitably supported on the base F are fittings 18 for attachment of a pressure lubricating device, such as a grease gun, not shown, the fittings 18 each being interconnected with a lubricant pipe line. The various lubricant supply lines are supported on a plate 19 and are illustrated at 20, 21, 21a, 22 and 22a, which lead to lubricant inlets 12a in the hub portions of the respective bearing caps, for supplying a proper supply of lubricant to each bearing.

The intermediate standards upon which the rollers are supported are generally similar in construction to the construction of each end standard, being, however, somewhat modified in detail to adapt these standards for their particular function. It will be seen that these intermediate standards D are substantially shorter than the terminal standards, the difference in height between the terminal standards and the intermediate standards producing the required inclination of the terminal rollers.

In view of the fact that each intermediate standard supports adjacent ends of contiguous rollers, each of these intermediate standards is made double. That is, each of these intermediate standards is composed of a pair of plates 23 and 24, united by an integral web 25. The plates 23 and 24 are formed with the U-shaped mountings 26, in each of which mountings there rests a hub portion 8 of the adjacent bearing caps of contiguous rollers.

The plates 23 and 24 flare outwardly at the bottom of each to provide the supporting mounting 27 which engages the sides of the angle base support F, and which is bolted or otherwise secured by fastening instrumentalities 28 to this base support.

It will be noted that the end gudgeons 1, together with the co-operating bearing caps 7 form a substantially flush surface at each end of each roller, except for the projecting hub portions 8 which directly carry the weight of the rollers. This flush surface prevents accumulation of dust and dirt on the rollers near the surface.

It will also be seen that the axle 2 constitutes a tie-rod interconnecting the various parts of the roller mechanism, and, by virtue of the oppositely directed threads on the ends of each axle, the parts of the mechanism at both ends of each cylinder will be simultaneously adjusted by a very simple manipulation of the tie-rod or axle 2 by the application of a suitable tool to the tongue 11, and then turning the axle. Since all weight of the roller is taken off from this rod or axle 2, the turning of this axle is easily accomplished without requiring the rollers to be dismounted from the supporting standards.

The disposition of the belt relative to the unit is indicated at E.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In a conveyor roller assembly, the combination with a roller, of a pair of adjustable bearings for supporting said roller, a pair of brackets for non-rotatably supporting said bearings by direct engagement with said bearings, and means for axially adjusting said bearings while supported on said brackets comprising a rotatably adjustable shaft, said shaft being screw-threaded with at least one of said bearings and having tool receiving means whereby it may be rotated while the roller is supported as aforesaid.

2. In a conveyor roller assembly, the combination with a roller, of a pair of adjustable bearings for supporting said roller, a pair of brackets for non-rotatably supporting said bearings by direct engagement therewith, and means for axially adjusting said bearings while supported on said brackets comprising a rotatably adjustable shaft, said shaft being oppositely screw-threaded with said bearings and having tool receiving means whereby it may be rotated while the roller is supported as aforesaid.

3. In a conveyor roller assembly, the combination with a roller, of a pair of adjustable bearings for supporting said roller, a pair of brackets for non-rotatably supporting said bearings, and means for axially adjusting said bearings while supported on said brackets comprising a rotatably adjustable shaft, said shaft being oppositely screw-threaded with said bearings and being provided with a tool receiving end adapted to be adjusted while the roller is assembled.

4. In a conveyor roller assembly, the combination with a roller, of a pair of adjustable bearings for supporting said roller, a pair of brackets for non-rotatably supporting said bearings, and means for axially adjusting said bearings while supported on said brackets comprising a rotatably adjustable shaft, said shaft being oppositely screw-threaded with said bearings and being provided with a tool receiving end adapted to be adjusted while the roller is assembled.

5. In a conveyor roller assembly, the combination with a roller, of a pair of bearings for supporting said roller, a pair of spaced brackets for non-rotatably supporting said bearings, the load on said roller being transmitted to said brackets directly through said bearings, and a non-load supporting shaft being oppositely screw-threaded into said bearings to provide adjustment thereof and having at least one head formed to receive a tool whereby it may be rotated when the roller is assembled.

6. In a conveyor roller assembly, the combination with a roller having a recessed end carrying an axial boss the outer peripheral surface of said boss providing a bearing surface, a stationary bearing having a cooperating bearing surface, a support for said stationary bearing, a lubrication passage in said bearing communicating with said bearing surfaces, a shaft extending loosely through said recessed end of the roller and attached to said bearing, a grease seal between said recessed end and said shaft and another grease seal between said bearing and said recessed end.

7. In a conveyor roller assembly, the combination with a roller, of a pair of bearing members for supporting said roller, a pair of spaced brackets for removably supporting said bearing members and for preventing rotation thereof, the load on said roller being transmitted to said brackets directly through said bearing members, and a non-load supporting shaft extending between said bearing members and having at least one end threaded in one of said members, and having a head formed to receive a tool whereby it may be rotated to adjust said bearing members when the roller is assembled on said brackets.

ARCHIBALD L. SMITH.